INVENTOR.
ROGER W. BOOM

BY Gerald A. Koris
ATTORNEY

INVENTOR.
ROGER W. BOOM
BY Gerald A. Koris
ATTORNEY

United States Patent Office 3,310,765

Patented Mar. 21, 1967

3,310,765

STABLE SUPERCONDUCTING MAGNET

Roger W. Boom, Woodland Hills, Calif., assignor to North American Aviation, Inc.

Filed July 26, 1965, Ser. No. 474,815
13 Claims. (Cl. 335—216)

Figure 1:
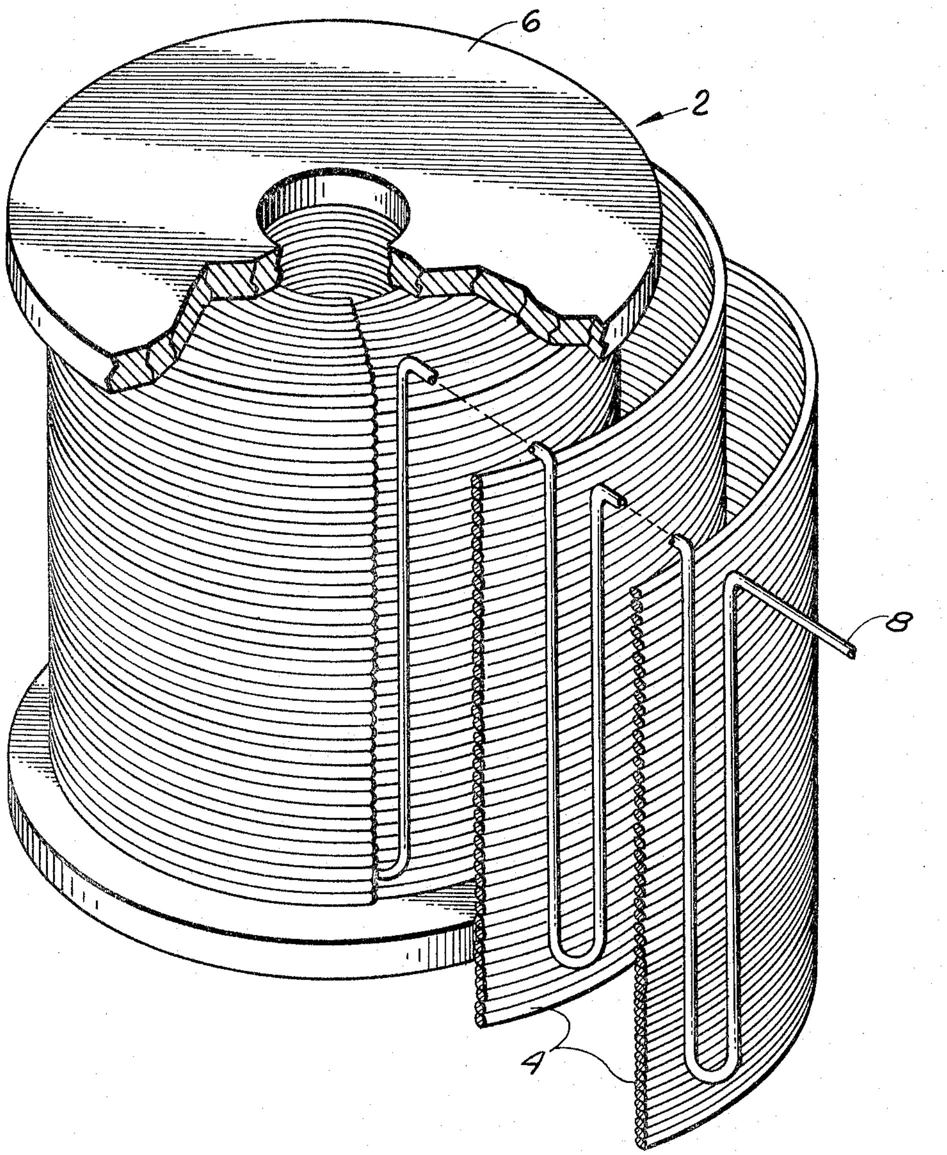

The present invention relates to a stable superconducting magnet, and more particularly to a method of operating a large superconducting solenoid without training.

Superconductors are conductive materials which show an abrupt and total loss of electrical resistance (and hence no power dissipation) below a certain cryogenic temperature termed the critical temperature, $T_c$, which is usually less than 18° K. The factors affecting the superconductivity of such materials are the interrelation of magnetic field strength H, current density J, and temperature T. The magnetic field strength, applied externally or generated by a current in the superconductor, limits superconductivity to below certain critical temperatures and current densities. Similarly, at a given current, an increase in field strength above a critical value can terminate superconductivity. The large current-carrying capacity of superconductors provides the basis for very compact, extremely powerful magnets which can be used in numerous applications where strong magnetic fields are required, for example, in lasers, masers, accelerators, and bubble chambers. A number of superconducting materials are known to the art, particularly combinations of elements in Groups IV and V of the Periodic Table and, of these, niobium-zirconium, titanium-niobium, and niobium-tin are of particular practical importance.

In the operation of large superconducting magnets a problem of some consequence results from the requirements of training the superconducting magnet. Training is a method by which superconducting magnets are brought to operate at maximum current capacity at a particular temperature, which is commonly 4.2° K., the temperature of the liquid helium refrigerant in general use. The maximum current-carrying capacity of a superconducting solenoid is not achieved initially, but must be reached through a series of steps; in each step the current is progressively raised over the value in the preceding step to the point that the superconductor is driven normal. Training is thus featured by a series of current increases interrupted by superconducting-normal transitions. For example, a typical magnet might be trained to achieve the following critical currents in sequence: 15 amps, 18 amps, 21 amps, 27 amps, 30 amps, and 35 amps. If maximum current and field strength are desired then the magnet must be driven normal seven times in this example before 35 amps is reached; in practice there are usually many normal-going transitions at each current level. Further, when a magnet is removed from a Dewar flask at the conclusion of a run and then later returned for a new run, retraining is required, and retaining may also be required when the magnet is left in the refrigerant at the conclusion of a run but de-energized.

Training is, therefore, a continuing matter in the operation of a superconducting magnet. This creates serious problems in the operation of large superconducting magnets, because the energy released in each superconducting-normal transition, $\frac{1}{2}LI^2$, heats the magnet and consumes the costly liquid gas refrigerant. As a result of such energy release and liquid gas consumption, it becomes physically difficult and economically unattractive to train large magnets. One ordinarily accepts a current level below that theoretically attainable with a given superconducting composition and designs the magnet accordingly. However, the disadvantage with this approach is that a larger, and therefore more costly, magnet must be built to achieve a given flux level.

The principal object of the present invention, therefore, is to provide a method of operating a superconducting solenoid at a relatively high current level without training.

Another object is to provide a method of operating a large superconducting magnet at a current level above that which can be practically realized without training, although below the maximum theoretical $I_c$.

Another object is to provide such a method wherein the superconducting magnet is not forced through a series of superconducting-normal transitions, nor is a large amount of liquid gas refrigerant lost by heat generation in order to reach operating conditions.

Still another object is to provide a large, stable, superconducting magnet having means for carrying greater supercurrents than a similar magnet could carry without training.

Still other objects and advantages of the present invention will become apparent from the following detailed discussion and the appended claims.

Figures 2, 3:
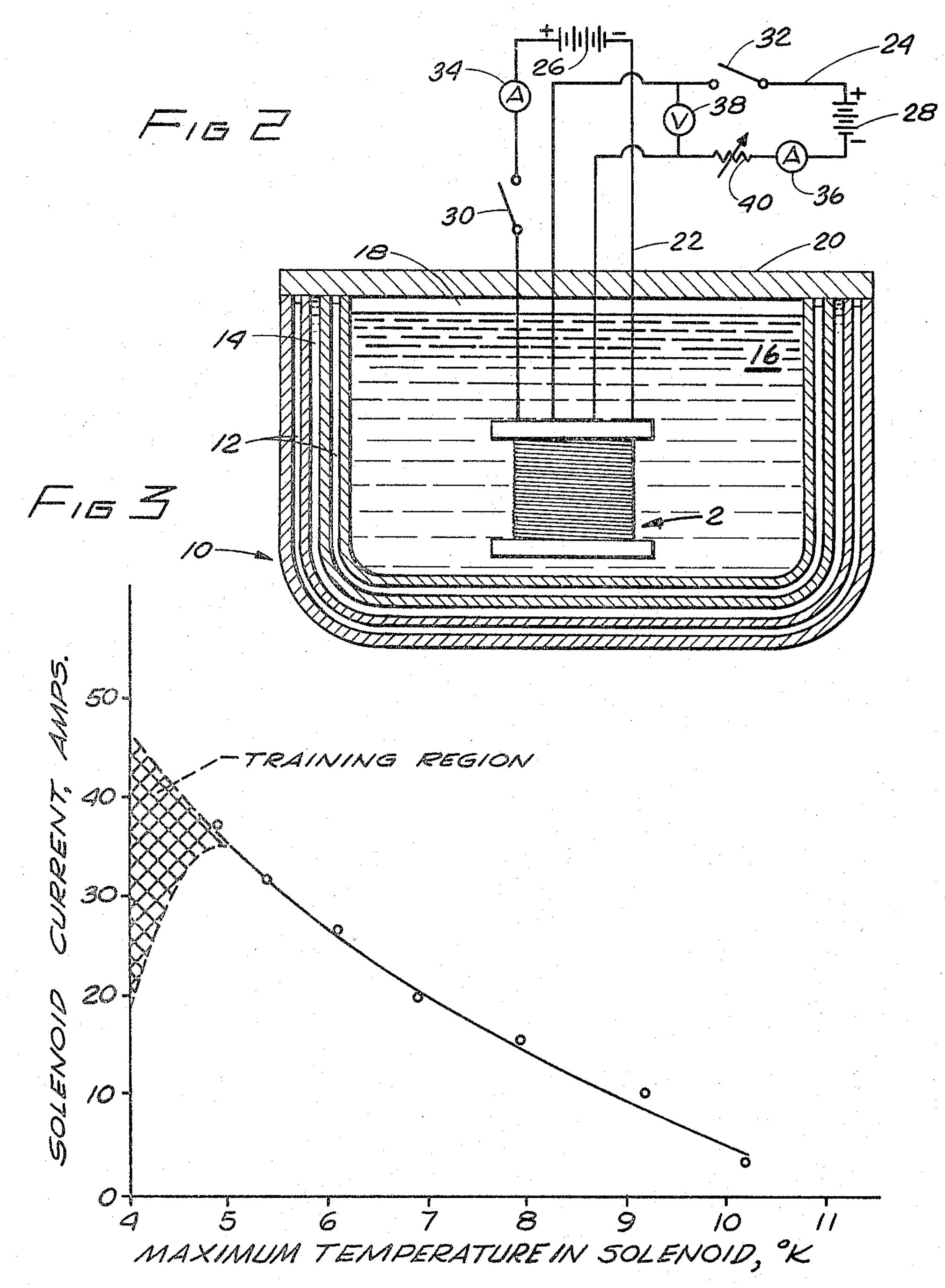

In the drawings, FIG. 1 is a perspective view of a superconducting solenoid embodying the present invention;

FIG. 2 is an overall view, partly in section, of a superconducting magnet apparatus; and FIG. 3 is a graph representing critical current as a function of solenoid temperature.

In accordance with the present invention, higher practical current levels are reached in large magnets than can otherwise be reached without training by adjusting the temperature of at least a portion of the magnet windings to above the temperature of the gas refrigerant in liquid form but below the critical temperature ($T_c$) of the superconducting material. In this manner, a higher practical current level is obtainable without a series of superconducting-normal transitions and, for a large magnet, the limiting magnet current and field obtained is thus higher.

The fundamental basis for the present improved performance is not entirely certain. It appears, however, that a "window" is provided for the escape of magnetic flux which is ordinarily trapped by flux pinning sites in a superconducting wire. Such magnetic flux tends to oppose electron travel by Lorenz forces, and hence diminishes transport current conduction. The heating of a portion of the superconducting solenoid above 4.2° K. (liquid helium temperature), but below $T_c$, provides an escape path for the expanding flux as a magnet is energized. It therefore appears that a material which is more porous to flux motion and possesses weaker pinning sites, both of which variables are a function of temperature, provides a more stable magnet. At elevated temperatures flux motion which is initiated by increasing solenoid current can thus be accommodated without large energy release to drive the material normal. A theoretical basis for the temperature effect of flux pinning which is utilized in the present invention is given by P.W. Anderson, "Physical Review Letters," 9, 309 (1962). While the theoretical $I_c$ thus realizable at the higher temperature through practice of the present invention is below the theoretical $I_c$ at the lower temperature ($I_c$ tends to decrease with increasing temperature below $T_c$), the current level practically obtainable without training is actually higher.

Further explanation of the present invention may be had by reference to the graph in FIG. 3 in which the maximum temperature for an epoxy potted solenoid is plotted against the transport current observed at a first superconducting-normal quench. The magnet was composed of Nb–25% Zr wire, copper plated. It should be understood that for other solenoid configurations and sizes or other superconducting materials, the proper temperature of operation would be different and may be readily determined by routine measurements. The cross-hatched region of the graph designates the training region where it is unpredictable where a first superconducting-normal transition will occur. Thus, it would be difficult in this region to design a magnet for a stable current level of more than about the 20-amp level, although it is seen that with training higher currents, up to about the 40-amp level, might theoretically be realized. However, at some higher temperature, for example, approximately 5.25° K., at least 30 amps may be assured without training. It is therefore evident from the graph that, while current declines with the increasing temperature, a higher stable current level can be achieved. In the given example, a magnet temperature of about 5–7° K. is preferred, for above about 7° K., current level drop is not compensated by any increased stability. Interestingly, after such stable current level is obtained, the magnet temperature may then be reduced to that of the bath without going normal or losing its current. This is consistent with the above-mentioned explanation that flux motion drives superconductors-normal; in this case temperature reduction causes no flux motion and therefore leaves the magnet current stable at the previous level. While reducing the temperature to that of liquid helium after a stable current level is reached is convenient and safer because one is then further below the critical value, economic advantages in terms of refrigerant cost may be had by operating the system (magnet and bath) at the higher temperature. Thus, in this embodiment of the invention helium could be in the gaseous phase above 4.2° K.

In FIG. 1 is illustrated a superconducting solenoid 2 comprising a plurality of layers of a fine superconducting wire 4, such as 10-mil niobium-zirconium or niobium-titanium, wound on a non-conducting core or spool 6. The spool may be of a normal metal or an organic resin such as a phenolic resin. A normal metal wire 8, such as copper or aluminum, is positioned along the width of each layer of superconducting wire 4 in the solenoid extending radially inward in the manner shown in the figure. The current supplied to normal conductor 8 serves to raise the temperature level of at least a portion of the solenoid to the desired temperature level which serves to effectively limit current conduction in the entire solenoid to the level set in the heated region.

FIG. 2 provides an example of the use of the present invention in a specific magnet device. Any number of magnet configurations may be devised by those skilled in the art, and the particular design will be determined by the proposed use of the superconducting device. The solenoid 2 of FIG. 1 is positioned in a double-walled Dewar flask 10 having two vacuum regions 12 with an intermediate region 14 containing liquid nitrogen. Other thermally insulated containers may be used. The vessel is filled with liquid helium 16 and separated from the environment by suitable closure means. The space 18 between the liquid gas and the cover 20 is filled with the refrigerant in gaseous form. Two separate electrical circuits using normally conductive wire are provided for solenoid 2, one 22 for energizing the superconducting solenoid, and the other 24 for heating the wire which adjusts the temperature of the solenoid. In each circuit is provided a power source of batteries 26 and 28, an on-off switch 30 and 32, and an ammeter 34 and 36. In addition, solenoid heater circuit 24 has a voltmeter 38 and a variable resistor 40. As there are no power losses in the superconducting magnet 2 once the magnet is energized, no further power is required to sustain the magnetic field and both external circuits 22 and 24 can be removed.

The following example is offered to illustrate the present invention in greater detail.

*Example*

A small solenoid in which a portion of the windings could be heated, of the same design as shown in FIGS. 1 and 2, was constructed and tested. The solenoid consisted of 1900 ft. of 0.010-in. diameter Nb-25% Zr copper plated wire, wound on a 0.9-in. I.D. spool and rated at 0.343 kg./amp. A copper wire was wound back and forth between successive layers of the superconducting wire and parallel to the solenoid axis. The heated volume was a 10 percent pie section (cylindrical coordinates) of the solenoid. The critical current was plotted against varying solenoid temperatures and the measurements shown in FIG. 3 taken. From FIG. 3 it is seen that the solenoid temperature limits the attained current. When I max. was adjusted with temperature to less than about 35 amps, at temperatures above about 5° K., no training was observed. For lower solenoid temperatures (below about 5° K.) at current levels above about 20 amps considerable training (i.e., superconducting-normal transitions) was observed.

The foregoing example is illustrative rather than restrictive of the present invention. It is understood that different configurations of the present invention may be devised by those skilled in the art within the scope of the present invention, including the specific temperatures employed, the composition of the superconducting material, and the magnet power level. Accordingly, the present invention should be understood to be limited only as is indicated in the appended claims.

What is claimed is:

1. A method of obtaining a relatively high current in a magnet of a superconducting material, positioned in a bath of a gas refrigerant, which comprises (a) adjusting the temperature of at least a portion of the superconducting material to above the temperature of said gas refrigerant in liquid phase but below the critical temperature for said superconducting material, and (b) passing a supercurrent through said magnet.

2. The method of claim 1 wherein the refrigerant is in the vapor phase and the magnet is at the same temperature below said critical temperature.

3. The method of claim 1 wherein the bath is of helium in the vapor phase and is at a temperature above 4.2° K. but below said critical temperature and wherein the superconducting material is at the same temperature.

4. A method of operating a superconducting magnet at a relatively high current level without training, which comprises (a) placing said magnet in a bath of a liquid gas refrigerant, (b) increasing the temperature of a portion of the magnet above the temperature of said liquid gas refrigerant but below the critical temperature for the superconducting material, and (c) then initiating the passage of supercurrent through said magnet.

5. The method of claim 4 wherein the liquid gas is helium and the temperature of said magnet is increased to between about 4.2° K. and about 18° K.

6. The method of claim 4 wherein the temperature of the magnet is reduced to that of the liquid gas refrigerant after passage of supercurrent through the magnet is initiated.

7. A method of operating a superconducting magnet containing a plurality of turns of a niobium-zirconium wire at a relatively high current level without training, which comprises (a) placinig said magnet in a bath of liquid helium, (b) heating said magnet to a temperature of about 5–7° K., and (c) while said bath is at a temperature of about 4.2° K. and said magnet at a temperature of about 5–7° K., establishing the passage of a superconducting current in said magnet.

8. The method of claim 7 wherein said niobium-zirconium consists of *Nb*–25 weight percent zirconium alloy.

9. The method of claim 7 wherein the magnet temperature is reduced to about 4.2° K. after establishment of a superconducting current therein.

10. A method of operating a superconducting magnet containing a plurality of turns of a niobium-zirconium wire at a relatively high current level without training, which comprises (a) placing said magnet in a bath of gaseous helium which is at a temperature of about 5–7° K., and (b) initiating the passage of a superconducting current in said magnet.

11. A superconducting magnet assembly comprising (a) a plurality of turns of a superconducting wire wound on a magnet core, (b) said magnet positioned in a container in a bath of a liquid gas refrigerant at a temperature below the critical temperature of said superconducting material, (c) electrical means connecting to said magnet for initiating the passage of superconducting current therethrough, and (d) electrical means connecting to said magnet for heating a portion thereof to a temperature above the temperature of the liquid gas refrigerant and below said critical temperature.

12. The superconductive magnet of claim 11 wherein said liquid gas in helium and said superconducting wire consists of niobium-zirconium alloy.

13. The superconducting magnet of claim 11 wherein said superconducting wire is further wound in a plurality of layers on said core and wherein said electrical heating wire is interleaved between said layers.

References Cited by the Examiner

UNITED STATES PATENTS

| | | | |
|---|---|---|---|
| 3,156,850 | 11/1964 | Walters | 335—216 X |
| 3,253,193 | 5/1966 | Lubell et al. | 335—216 |

BERNARD A. GILHEANY, *Primary Examiner.*

G. HARRIS, *Assistant Examiner.*

UNITED STATES PATENT OFFICE
CERTIFICATE OF CORRECTION

Patent No. 3,310,765 March 21, 1967

Roger W. Boom

It is hereby certified that error appears in the above numbered patent requiring correction and that the said Letters Patent should read as corrected below.

Column 1, line 9, before "The " insert the following paragraph:

The invention described herein was made in the performance of work under a NASA contract and is subject to the provisions of Section 305 of the National Aeronautics and Space Act of 1958, Public Law 85-568 (72 Stat. 435; 42 U.S.C. 2457).

same column 1, line 58, for "retaining" read -- retraining --; column 4, line 7, for "kg." read -- kG. --.

Signed and sealed this 12th day of November 1968.

(SEAL)
Attest:

EDWARD M.FLETCHER,JR.
Attesting Officer

EDWARD J. BRENNER
Commissioner of Patents